Feb. 28, 1928.
D. C. KLAUSMEYER
1,660,386
HEAD TO ARM CLAMPING MECHANISM
Filed May 5, 1925
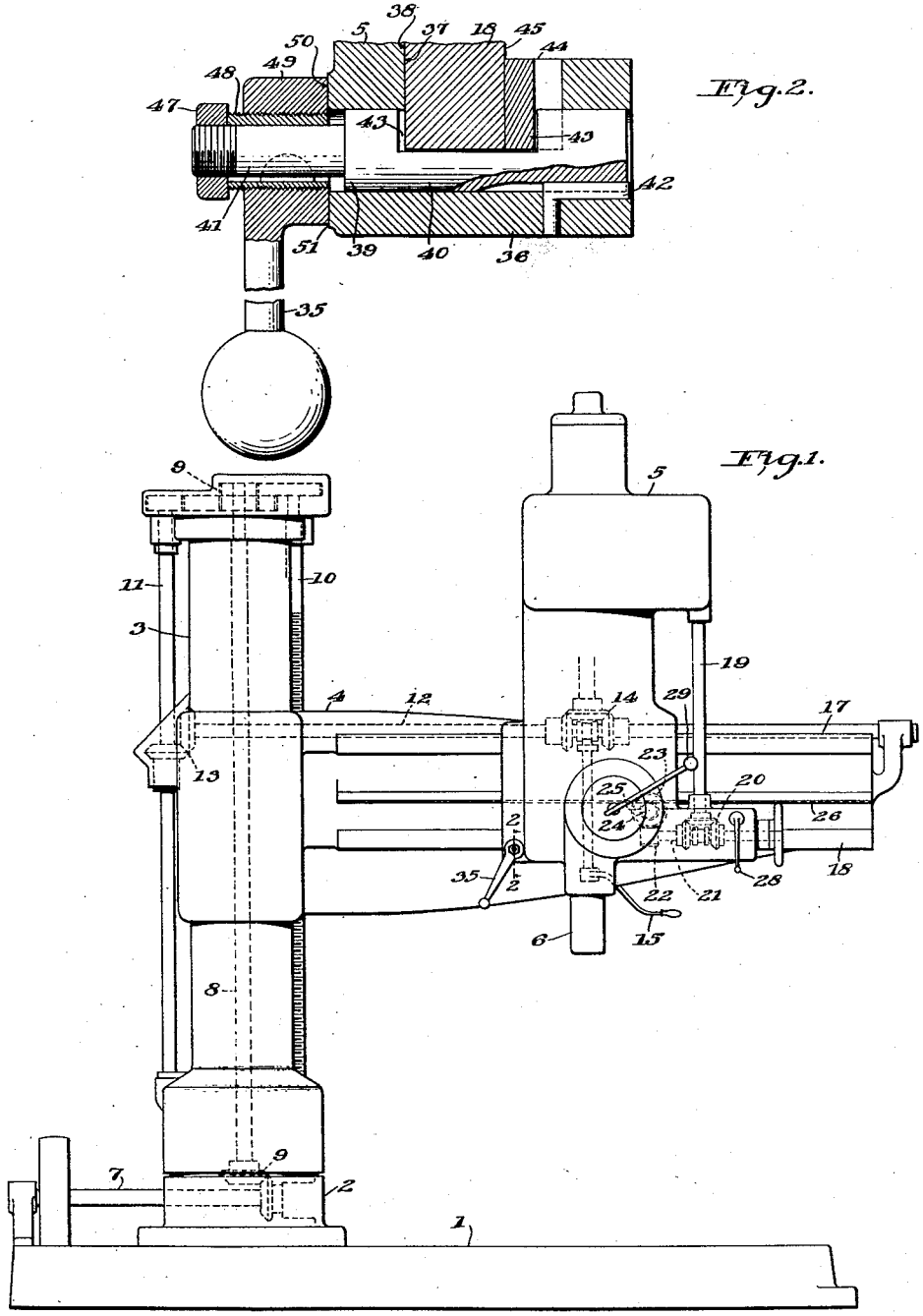
Inventor
David C. Klausmeyer
By Attorney
Albert F. Nathan Patented Feb. 28, 1928.

1,660,386

UNITED STATES PATENT OFFICE.

DAVID C. KLAUSMEYER, OF CINCINNATI, OHIO, ASSIGNOR TO THE CINCINNATI BICKFORD TOOL COMPANY, OF OAKLEY, CINCINNATI, OHIO, A CORPORATION OF OHIO.

HEAD-TO-ARM CLAMPING MECHANISM.

Application filed May 5, 1925. Serial No. 28,213.

My invention is concerned with clamping mechanism for a drilling machine and is particularly concerned with mechanism for clamping the drill head of a radial drilling machine to the radial arm.

In a radial drilling machine, a radial arm is mounted on a column or post so as not only to have vertical movement along the column but also to have rotative movement about the column. The radial arm carries a drill head which supports the drill spindle and the drilling tool. Before a drilling operation is commenced, it is necessary not only to adjust and clamp the radial arm with respect to the column but it is also necessary to adjust the drill head along and clamp it to the radial arm. The radial arm is provided with guide bars along which the drill head is adjusted. Moreover the guide bars serve as a support to which the drill head is clamped when adjusted to an operative position. In the machines heretofore constructed, the radial arms have been provided with an upper and a lower guide bar and in some cases an intermediate bar is provided. In the machines of the above type as heretofore constructed, the drill head has been clamped either to the top or the intermediate guide bar.

One of the chief objects of my invention is to provide a clamping mechanism for securely clamping the drill head in any set position on the radial arm. My invention provides a clamping bolt which is mounted on the drill head in position to effect clamping engagement with the lower guide bar on the radial arm. The clamping bolt is mounted on the drill head at the point having the greatest tendency to move away from the radial arm by reason of the pressure exerted by the drill on the work. When the drill is in operation and in engagement with a piece of work, it is apparent a force will be exerted tending to force the lower part of the head away from the arm. In order to more efficiently clamp the head to the arm, the clamp is mounted on the head as near as possible to the cutting point of the drill. The clamping bolt is provided with a body portion so constructed as to effect clamping engagement with a guide bar on the radial arm. Near one end of the bolt is mounted an adjusting nut which not only limits the axial movement of a sleeve along the bolt but also is adjustable for the wear of the parts comprising the clamping mechanism. The sleeve is slidably and nonrotatably mounted on the clamping bolt and engages the adjusting nut during a clamping operation. An operating nut, which is threadably connected to the sleeve, is screwed along the sleeve to effect clamping engagement with a surface on the head. A hand lever is secured to or formed as an integral part of the operating nut for rotating such nut to effect a clamping operation. The hand lever should be in a position whereby an efficient purchase may be obtained by the operator of the machine during a clamping operation.

In many machines the hand lever, which effects the clamping of the head to the radial arm, may be originally positioned whereby the operator may obtain a good purchase for a clamping operation. However, upon wear of the clamping mechanism the position of the clamping lever is changed until a position is reached where the operator has a poor purchase for effecting a clamping operation.

In a clamping mechanism constructed in accordance with my invention the adjusting nut may be operated to change the position of the sleeve and compensate for all wear of the clamping mechanism. The adjusting nut may be operated to maintain the hand lever in such position that the operator obtains a good purchase irrespective of the wear of the various parts.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is an elevational view of a radial drilling machine having a clamping mechanism constructed in accordance with my invention. Fig. 2 is a sectional view along the line 2—2 of the clamping mechanism illustrated in Fig. 1.

Referring to the accompanying drawing, a radial drilling machine is illustrated comprising a base 1 upon which is mounted a column or post 2. A sleeve member 3 of conventional construction is rotatably mounted on a column 2 and carries a radial arm 4. The radial arm 4 is adapted to move vertically on the sleeve member 3 and carries a drill head 5. The drill head 5 carries a drill spindle 6 which in turn carries a suitable drilling tool (not illustrated).

A main power shaft 7, which is mounted on the base 1, is connected to a vertical driving shaft 8 by means of bevel gear wheels 9. The vertical driving shaft 8 extends through the column 2 to a set of gearing 9 which is suitably mounted at the top of the sleeve 3. The gearing 9 is connected to an elevating screw shaft 10 and to a spline shaft 11. The screw shaft 10 serves to raise and lower the radial arm 4 on the sleeve 3 and the spline shaft 11 serves to operate a shaft 12 on the radial arm 4 by means of bevel gears 13. The arm shaft 12 is connected to a bevel gear mechanism 14 under the control of a hand lever 15 for operating the drill spindle 6. The hand lever 15 operates the gear mechanism 14 through a clutch mechanism in a well known manner for controlling the direction of rotation of the drill spindle 6. Suitable change gears (not shown) are provided between the bevel gear mechanism 14 and the drill spindle 6 for controlling the speed of rotation of the spindle.

The drill head 5 is movable along two guide bars 17 and 18 which are formed on the radial arm 4. The movement of the drill head along the guide bars may be effected by means of the shaft 19 which is connected through suitable gearing (not shown) to the shaft 12 on the radial arm. The shaft 19, which effects movement of the drill head along the radial arm, is connected through a bevel gear mechanism 20 to a shaft 21. The shaft 21 carries a worm 22 which meshes with a worm wheel 23. The worm wheel 23 is mounted on a shaft 24 which carries a pinion 25. The pinion 25 meshes with a rack 26 which is formed on the radial arm 4. The rotation of the shaft 21 by means of the shaft 19 through the bevel gear mechanism 20 is controlled by a hand lever 28. Thus, the hand lever 28 controls the direction of movement of the drill head 5 along the radial arm 4. Inasmuch as the above described mechanism is not specifically related to the present invention it has been deemed unnecessary to describe and illustrate the exact gearing mechanism contained within the drill head 5 for connecting the shaft 12 to the drill spindle 6 and for connecting the shaft 12 to the shaft 19 which operates the drill head along the radial arm. A hand lever 29, shown at the front of the drill head, is provided for effecting a rapid traverse of the drill spindle to and from the work. A detailed description of this mechanism is deemed unnecessary in this application.

Before a drilling operation can be effected it is necessary not only to clamp the sleeve member 3 in a set position but also to clamp the drill head 5 in position on the radial arm. The clamping of the drill head 5 to the radial arm 4 is controlled by means of a hand lever 35. The hand lever 35 serves to clamp the drill head 5 to the lower guide bar 18 on the radial arm 4. Referring to Fig. 1 of the drawing, it will be noted the hand lever 35 for effecting the clamping operation is located at the lower left corner of the drill head 5. The pressure of the drill on the work exerts a force on the drill head tending to move it away from the arm. The normal right hand rotation of the drill further exerts a force or torque tending to turn the head about a vertical axis. The maximum pressure thus exerted will be located substantially at the lower left corner of the head where the clamping bolt is located as shown in Fig. 1 of the drawing. In other words this is the point where, as a result of the combined forces, the greatest displacement tends to occur.

Referring to Fig. 2 of the drawing, it will be noted the frame of the drill head 5 is provided with a lower hook shaped portion 36 which projects around the lower part of the guide bar 18. The front surface 37 of the guide bar 18 engages a surface 38 on the head 5 when the head is clamped to the radial arm. A clamping bolt 39, which is mounted in the hook portion 36 of the tool head, is provided with an enlarged body portion 40 and a reduced portion 41. The body portion 40 is secured to the head 5 by means of a spline member 42 in order to effect a limited longitudinal movement in the head but not to effect any rotative movement. A transverse slot 43 is formed in the body portion 40 of the clamping bolt to receive not only the lower part of the guide bar 18 but also to receive a portion 43 of a gib member 44. The gib member 44 is positioned between the rear surface 45 of the guide bar 18 and the hook portion 36 of the drill head 5 as best shown in Fig. 2 of the drawing. A notch is cut in the gib member 44 to receive the body portion 40 of the clamping bolt. In the above construction, it should be noted clamping engagement is effected between the surface 45 on the guide bar 18 and the front surface of the gib member 44.

A nut 47 is connected to the end of the clamping bolt and adjacent to such nut 47 is mounted a sleeve 48. The sleeve 48 is splined to the bolt 39 so as to effect a limited longitudinal movement under certain conditions. The hand lever 35, which as before set forth controls the clamping of the drill head to the radial arm, is provided with a hub portion 49. The hub portion 49 is formed in the nature of an operating nut and is threaded to the sleeve member 48. A surface 50 on the hub portion 49 of the hand lever is adapted to engage a surface 51 on the drill head during a clamping operation.

In order to securely clamp the drill head 5 to the guide bar 18 of the radial arm, the hand lever 35 is screwed along the sleeve 48 to force the surface 50 securely in engagement with the surface 51 on the drill head. Such movement causes the gib member 44 to be forced into clamping engagement with the guide bar 18. In order to effect a quick and reliable clamping of the head to the radial arm it is necessary to have the hand lever 35 in a position where the operator can obtain a good purchase on it during the clamping operation. Although such lever may be initially in a position whereby the operator may obtain a good purchase on it during the clamping operation it is apparent that the wear on the various clamping parts will change the position of such lever. In time it is apparent the lever may occupy a position whereby it is very inconvenient for the operator to effect a clamping operation. In order to adjust the position of the lever 35 for effecting the clamping operation, the nut 47 is operated for varying the position of the sleeve member 45. The rotative position of the hand lever 35 for effecting the clamping operation is controlled directly in accordance with longitudinal position of the sleeve member 48. Thus it is apparent by controlling the nut 47 it is possible to control the rotative position of the hand lever 35.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:—

1. In a drilling machine, in combination, a radial arm; a drill-head mounted on and movable along said arm; a substantially rectangular guide-bar for said head provided by said arm, said guide bar providing substantially parallel vertical walls; a hook-shaped portion of said head extending around said guide-bar to three sides thereof; a gib held within said hook portion adjacent one face of said guide-bar; and a clamping bolt translatably supported at opposite sides of said guide-bar in said hooked portion and having a shoulder adapted to engage said gib to move it in a direction perpendicular to the vertical walls, thereby to force it firmly into engagement with said guide-bar to clamp the head to the arm.

2. In a drilling machine, the combination comprising a column; a radial arm mounted on the column and having a guide-bar thereon; a drill head mounted on and movable along said arm, said head having a hook portion engaging said guide-bar; a gib member mounted on said head and engaging said guide-bar; a clamping bolt mounted on the lower corner of said head adjacent to said column and having a slot cut therein to receive said guide-bar and the gib member; and means for operating said bolt to clamp the gib member against the guide-bar and hold the head in a set position.

3. In a drilling machine, the combination comprising a radial arm having a plurality of guide bars thereon; a drill head mounted on and movable along said guide bars on the arm; a clamping bolt mounted on the lower corner of said head for engaging the lower guide bar to hold the head in any set position along the arm, said bolt being axially movable in the head for clamping and unclamping the head to and from the arm; an adjusting nut secured to the end of bolt; a sleeve member slidably and non-rotatably mounted on said bolt and having threads formed thereon; and an operating nut having an operating handle secured thereto and threadably connected to said sleeve member, said operating nut engaging the head for effecting axial movement of the bolt.

4. In a drilling machine, the combination comprising a radial arm having an upper and a lower guide bar thereon; a drill head mounted on and movable along said guide bars; a clamping bolt mounted on said head at the lower left hand corner thereof, as viewed from the front, for engaging said lower guide bar at the point where the head first tends to move away from the arm to hold the head in any set position on the arm, said bolt being moved axially to clamp the head to the arm; a sleeve member slidably mounted on said bolt and held against rotative movement; means for limiting the axial movement of the sleeve member in one direction along the bolt; and an operating nut threadably connected to said sleeve and adapted to be rotated into engagement with a face of said head during clamping of the head to the arm.

5. In a drilling machine, in combination, a radial arm; upper and lower guide-bars extending lengthwise of said arm, the lower guide-bar being substantially rectangular; a drill-head translatably mounted thereon; a clamp located at the lower left hand corner of the drill-head, as viewed from the front, for gripping the lower guide-bar and clamping the head to the arm at the point where the greatest displacement tends to occur due to the torque exerted during right hand rotation of the drill and the pressure on the work; and means to actuate said clamp.

6. In a drilling machine, the combination comprising a radial arm having a guide bar located at the lower part thereof; a drill head movable along said arm and having a hook portion engaging said guide-bar; a bolt slidably and non-rotatably mounted in the lower corner of said head and having a transverse slot formed therein for receiving said guide bar and for providing a surface to clamp the guide bar; an adjusting nut mounted on said bolt; a sleeve slidably and non-rotatably mounted on the bolt adjacent to said adjusting nut; and an operating nut threadably connected to said sleeve and having a clamping surface for engaging a clamping surface on said head.

7. In a radial drilling machine, the combination comprising a column; a radial arm supported on said column and having a plurality of guide bars thereon; a tool head supported on and movable along said guide bars; and a clamping mechanism located at the head nearest the lower corner of the head nearest the column for clamping the head to the lower bar where the greatest displacement tends to occur due to the torque exerted during right hand rotation of the drill and the pressure on the work.

8. A clamping mechanism for clamping together two members of a radial drill comprising a bolt slidingly fitted within one of said members and held against rotation therein; a clamping nut rotatably mounted co-axial with said bolt and bearing against one of said members and adapted indirectly to effect axial movement of said bolt; a shoulder on said bolt adapted, by the axial movement of said bolt, to grip the other of said members; and means intermediate said nut and said bolt to shift said nut axially of said bolt to compensate for wear without varying the angular position of said nut.

9. In a radial drill the combination comprising a radial arm having a guide bar on the lower part thereof; a drill head; a bolt mechanism for clamping said head to the guide bar, said mechanism comprising a bolt slidably and non-rotatably mounted on said head and having a body portion provided with a surface substantially at the axis of said bolt for effecting clamping engagement with said bar, an adjusting nut mounted on one end of the bolt, a sleeve slidably and non-rotatably mounted on said bolt adjacent to said adjusting nut, and an operating nut threadably connected to said sleeve and screwed into engagement with the head carrying said bolt for effecting clamping engagement between the head and the guide bar.

In witness whereof, I have hereunto subscribed my name.

DAVID C. KLAUSMEYER.